United States Patent
Kirstein et al.

(10) Patent No.: US 11,952,102 B2
(45) Date of Patent: Apr. 9, 2024

(54) TEXTILE DOOR INSULATION MEANS FOR A PASSENGER DOOR IN AN AIRCRAFT

(71) Applicant: Airbus Operations GmbH, Hamburg (DE)

(72) Inventors: Hauke Kirstein, Hamburg (DE); Gunter Kyas, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/724,566

(22) Filed: Apr. 20, 2022

(65) Prior Publication Data

US 2022/0348305 A1 Nov. 3, 2022

(30) Foreign Application Priority Data

Apr. 28, 2021 (EP) .................................. 21171025

(51) Int. Cl.
*B64C 1/40* (2006.01)
*B64C 1/14* (2006.01)

(52) U.S. Cl.
CPC ............ *B64C 1/403* (2013.01); *B64C 1/1423* (2013.01)

(58) Field of Classification Search
CPC ......... B64C 1/40; B64C 1/403; B64C 1/1407; B64C 1/1423; B64C 1/1461
See application file for complete search history.

(56) References Cited

U.S. PATENT DOCUMENTS

| 4,785,741 | A | 11/1988 | Gronow |
| 10,059,425 | B2 | 8/2018 | Vetter et al. |
| 2009/0090812 | A1 | 4/2009 | Boock et al. |
| 2010/0251654 | A1* | 10/2010 | Paul ...................... E06B 3/7001 52/506.05 |
| 2011/0101160 | A1 | 5/2011 | Gomes et al. |
| 2013/0240163 | A1* | 9/2013 | Mosler ............... B64D 11/0023 160/368.1 |
| 2015/0329194 | A1 | 11/2015 | Joern et al. |
| 2018/0346091 | A1 | 12/2018 | Movsesian et al. |

(Continued)

FOREIGN PATENT DOCUMENTS

EP        2018317 B1    2/2012

OTHER PUBLICATIONS

Innovations in Textiles (Aug. 2, 2013). ANA selects performance polyesters for in-flight comfort. https://www.innovationintextiles.com/smart-textiles-nanotechnology/ana-selects-performance-polyesters-for-inflight-comfort/ (Year: 2013).*

(Continued)

*Primary Examiner* — Joshua J Michener
*Assistant Examiner* — Ka Chun Leung
(74) *Attorney, Agent, or Firm* — Greer, Burns & Crain, Ltd.

(57) ABSTRACT

An aircraft cabin section includes a door frame, which forms a door opening, a passenger door, which is arranged on the door frame and is configured to close the door opening, and a door insulation arrangement, which is larger in at least one direction than the door opening. The door insulation arrangement is produced from a textile which is heat-insulating and/or airflow-inhibiting. Furthermore, a corresponding door insulation arrangement and an aircraft having such an aircraft cabin section or such a door insulation arrangement are disclosed.

6 Claims, 3 Drawing Sheets

(56) References Cited

U.S. PATENT DOCUMENTS

2019/0048649 A1    2/2019  Koenitz

OTHER PUBLICATIONS

Lantal (Feb. 22, 2016). Polyester Curtains—Aircraft—Lantal. Internet Archives. https://web.archive.org/web/20160222063626/https://www.lantal.com/america/en-us/aircraft/products/cabin-dividers/curtain-fabrics/polyester/ (Year: 2016).*
Emapa (Dec. 28, 2017). Cessna 172 & 175 T-41, T-41A/C Aircraft Protection Covers, Reflectors and Plugs. Internet Archives. https://web.archive.org/web/20171228151711/https://www.emapa.aero/Cessna-172-175-T-41-T-41A-C-Aircraft-Protection-p/coverscessna172.htm (Year: 2019).*
Mirror Online (Oct. 29, 2019). Passenger's hack changes plane seat into bed—but others say it's dangerous. https://www.mirror.co.uk/travel/news/passengers-hack-changes-plane-seat-20748941 (Year: 2019).*
Kelly, Tom. "Terror at 27,000ft: Crew Plug Gap in Super Jumbo Jet Door with Blankets and Pillows Stuck Together." Daily Mail, Mar. 13, 2013, www.dailymail.co.uk/news/article-2279416/My-terror-27-000ft-Jet-door-blew-open-crew-plugged-gap-blankets-says-Briton.html. (Year: 2013).*
"Emirates—First Class Blanket." Facebook, Apr. 2, 2017, www.facebook.com/Emirates/photos/a.859522417490842/1135994313176983/?type=3. (Year: 2017).*
European Search Report, for Application No. EP 21171025. 6A.

* cited by examiner

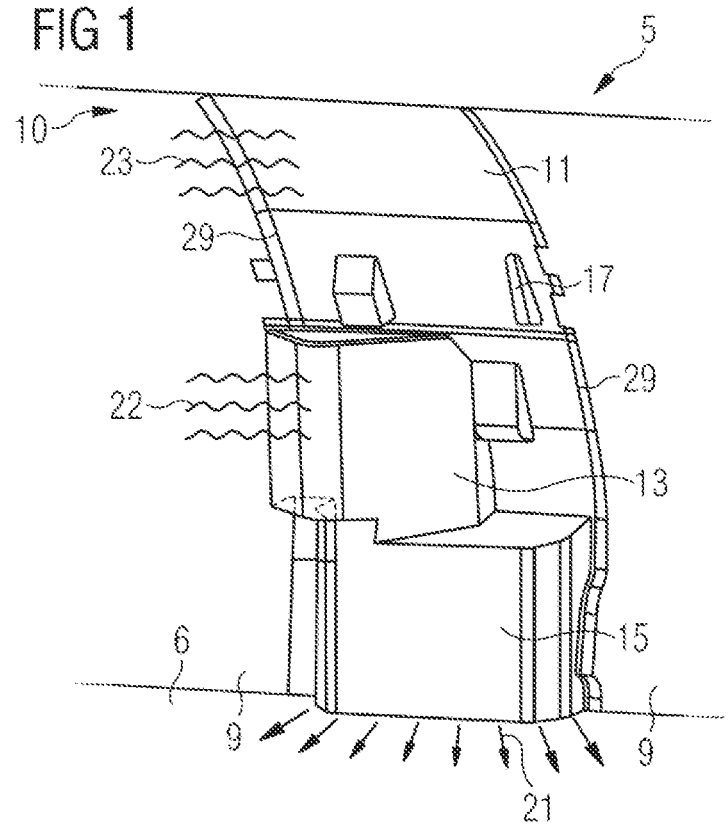
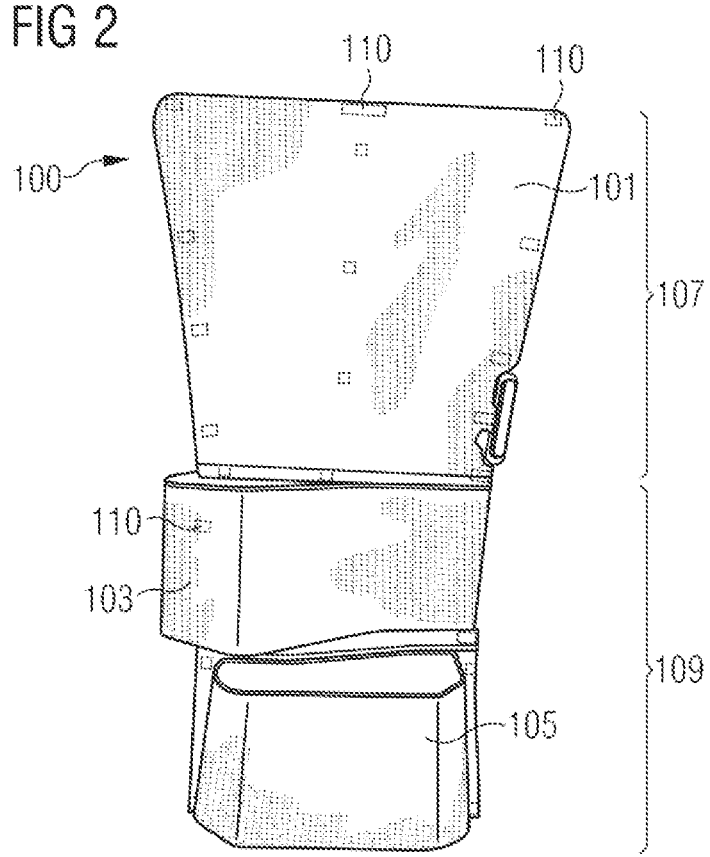

TEXTILE DOOR INSULATION MEANS FOR A PASSENGER DOOR IN AN AIRCRAFT

CROSS-REFERENCES TO RELATED APPLICATIONS

This application claims the benefit of the European patent application No. 21171025.6 filed on Apr. 28, 2021, the entire disclosures of which are incorporated herein by way of reference.

FIELD OF THE INVENTION

The present invention relates to an aircraft cabin section, which comprises a passenger door and a door insulation means, and to a corresponding door insulation means and associated aircraft. In particular, the present invention relates to an aircraft cabin section having a door insulation means, which is larger in at least one direction than a door opening of the passenger door and is heat-insulating and/or airflow-inhibiting. Furthermore, the present invention relates to such a door insulation means and to an aircraft having such an aircraft cabin section or a door insulation means.

BACKGROUND OF THE INVENTION

Next to a passenger door in aircraft there is generally a short aisle through which the passengers enter and leave the aircraft. Positioned along the aisle are certain aircraft facilities, for example aircraft galleys, on-board lavatories or other areas in which cabin crew and/or passengers linger during the flight.

The passenger door and associated door opening interrupt a skin and external insulation means of the aircraft. Furthermore, the passenger door itself is frequently not as precisely well insulated as the remaining aircraft fuselage, for example for weight reasons or necessary technical devices in the passenger door (for example, an emergency chute). A passenger door surface facing the aircraft cabin is therefore generally colder during the flight than other wall sections of the aircraft cabin. Furthermore, a cold air flow may also escape from a slit surrounding the passenger door and may be noticeable in the aircraft cabin.

As a result, the air in the short aisle is generally colder and is perceived as being unpleasant by cabin crew working or resting there. A cold air flow specifically is perceived to be particularly unpleasant on long haul flights (for example a flight time at high altitude of longer than four hours). Some members of the cabin crew have therefore, for example, stuck blankets or other toric objects provided for this purpose into the slit surrounding the passenger door, in particular on the floor.

SUMMARY OF THE INVENTION

The invention is therefore based on the object of providing an improved door insulation means for a passenger door in an aircraft.

For better understanding of the present disclosure, according to a first aspect, an aircraft cabin section comprises a door frame, which forms a door opening, and a passenger door, which is arranged on the door frame and is designed to close the door opening. The door opening is provided, for example, in a skin and in a fuselage of the aircraft and serves, in particular, for the boarding and disembarking of passengers. Of course, the door opening and the passenger door may also be an emergency exit from the aircraft, for example an emergency exit door over the wings of the aircraft.

In the interior of the aircraft cabin, an aisle can subsequently extend from the door opening, the aisle being bordered by fixtures, for example cupboards, equipment for a galley and trolleys, or else rows of seats in the case of an emergency exit. Seating for cabin crew may likewise be located in this area. Terms used here such as "on the inside" and "on the outside" relate to an aircraft cabin, wherein "on the inside" means inside the aircraft cabin or in the direction of a center of the aircraft cabin, and "on the outside" means outside the aircraft cabin or of the aircraft or in a direction from a center of the aircraft cabin towards a surrounding area of the aircraft. An interior lining, for example, can have an inner side and an outer side, wherein the inner side can be visible from the interior of the aircraft cabin, and the outer side is the opposite side and faces a surrounding area of the aircraft.

The aircraft cabin section furthermore comprises a door insulation means, which bears, at least in sections, against the passenger door and is larger in at least one direction than the door opening, wherein the door insulation means is produced from a textile material which is heat-insulating and/or airflow-inhibiting. In particular, the door insulation means is larger in the at least one direction than the door leaf of the passenger door, and therefore the door insulation means covers a gap between the passenger door and the door frame and/or an interior lining of the aircraft cabin next to the door opening.

Merely as an example, the material of the door insulation means may have a heat transfer coefficient of 1 to 30 W/(m2*K) and preferably a heat transfer coefficient of 8 to 12 W/(m2*K).

In one implementation variant, the door insulation means can be dimensioned in such a manner that it is larger in a lower section than the door opening and preferably rests on a floor of the aircraft cabin section. It has turned out that most cold air flows into the aircraft cabin, in particular in the region of the passenger door close to the floor of the aircraft cabin section. The door insulation means dimensioned in such a manner makes it possible in a simple manner to block this air flow.

Since a passenger door in an aircraft customarily comprises four sides, "larger in at least one direction" means that the door insulation means is larger at least in sections on one of the sides than the door leaf or the door opening. For example, the door insulation means can be larger on two opposite sides of the passenger door than the door opening such that the door insulation means has a greater width than the door opening. In another example, the door insulation means is upwardly larger than the door opening such that a gap along a lintel of the door frame is covered by the door insulation means. In yet another example, the door insulation means is downwardly larger than the door opening such that a gap along a door sill of the door frame is covered by the door insulation means. Of course, in any combination of these examples, the door insulation means can be larger than the door opening, and this can optionally also only be the case in a section of such a side.

The door insulation means therefore prevents a flow of cold air which enters the interior of the aircraft cabin through a gap. At least, however, such a cold air flow is reduced or retarded. Furthermore, the door insulation means permits shielding of the cold surface of the passenger door in relation to the interior of the aircraft cabin. The working area of the cabin crew or an area occupied by passengers can therefore be made more pleasant by simple and cost-effective means.

In addition, a portion of the passenger door or the entire passenger door can be covered by the door insulation means, and therefore the passenger door can be made visually more attractive. A passenger door generally has a multiplicity of bulges and depressions, handles, levers, signs, etc., which do not have to be visible or reachable during the flight. A uniformly configured door insulation means visually greatly upgrades the aircraft cabin section.

In one implementation variant, the door insulation means completely covers the passenger door and likewise completely covers the gap between door opening and passenger door on at least one side of the passenger door.

Furthermore, it is possible to apply an application on the door insulation means, for example in the form of an imprint, embroidery, etc. For example, a company logo of the aircraft operator, an image or the like can be applied.

In one implementation variant, the aircraft cabin section can comprise a first holding element, which is arranged on the door frame and/or on the passenger door, and a second holding element, which is arranged on and/or in the door insulation means. The second holding element is designed, in particular, to enter into operative connection with the first holding element and to hold the door insulation means.

The position of a second holding element in/on the door insulation means is selected here in such a manner that it corresponds to a position of a first holding element and determines the position of the door insulation means relative to the door opening and the passenger door in such a manner that the door insulation means in each case at least in sections covers the passenger door and a gap between passenger door and door frame.

For example, a first holding element can be arranged on the door frame in the direct vicinity of the door opening and therefore with respect to the passenger door (if the latter is in a closed state). A corresponding second holding element can be attached in/to an edge region of the door insulation means. If the first and second holding element now enter into operative connection, the edge region of the door insulation means is brought to overlap the door frame, as a result of which the door insulation means covers the gap between passenger door and door frame and the door insulation means is securely held in this position.

Alternatively or additionally, at least one first holding element can be arranged on the passenger door while a corresponding second holding element is arranged at a matching position of the door insulation means. As a result, the door insulation means can be fastened to the passenger door, for example to an interior lining, a fitting, a pivoting arm and/or a device of the passenger door and can ensure that the door insulation means lies against the passenger door.

A first and second holding element can be arranged, for example, in an outer edge region of the passenger door or of the door insulation means. The door insulation means can thereby likewise be held in a position in which the edge region of the door insulation means covers a gap between passenger door and door frame. For example, the door insulation means can extend (freely) further outwards than the position of the second holding element in the edge region of the door insulation means. Holding elements on the door frame can be dispensed with in this case.

These attachment variants of the door insulation means to the door frame and/or the passenger door provide a particularly space-saving attaching of the door insulation means in the aircraft cabin section. The door insulation means takes up space in the passenger cabin only in accordance with its thickness. However, the thickness of the door insulation means is negligible because of modern insulating materials. By the door insulation means lying against the passenger door, virtually no space inside the aircraft cabin is blocked or shut off by the door insulation means (as would be the case, for example, if there were a curtain).

Furthermore, no toric elements which can easily slip and can therefore constitute trip hazards and similar obstacles are laid in the floor region of the door.

In another implementation variant, the first holding element can comprise a magnetic material or a magnetically effective material and, corresponding thereto, the second holding element can comprise a magnetically effective material or a magnetic material. In other words, a pair made up of a first and a corresponding second holding element consist of a magnet and a magnetically effective material. The magnetically effective material can be, for example, a metal. This form of attaching the door insulation means is particularly weight-saving since a limited number of first and second holding elements only have to be provided at predefined positions in the aircraft cabin section.

In yet another implementation variant, the magnetic material or the magnetically effective material of the first holding element can be arranged on an outer side of a lining element of the door frame or of the passenger door. In other words, the first holding element is arranged on a side of the lining element that is not visible from the aircraft cabin and is therefore "concealed". Since lining elements in aircraft are generally produced from thin plastic, the magnetic forces can act through the lining element and the door insulation means can be placed onto the lining element and fastened "thereto".

In a further implementation variant, regions of the lining element, on the outer side of which a first holding element is arranged, can be identified visually or haptically. For example, the lining element can have, at this point, a different color, a sticker, a surface structure (roughening, grooves or the like), a depression and/or an elevation. The first holding element can therefore be rapidly located, and the door insulation means can be rapidly attached in the aircraft cabin section.

In a further implementation variant, the first and second holding element can together form a press stud or a hook and loop fastener. These two types of holding means always comprise two corresponding elements acting mechanically one in the other, wherein one form is arranged on the door frame and/or on the passenger door and the other form is provided on/in the door insulation means.

Although this type of holding elements is visible from the aircraft cabin (in comparison to a concealed, magnetically acting holding element), the locating of the holding elements is facilitated. Similarly, one half of a press stud or one side of a hook and loop fastener can also be easily retrofitted in existing aircraft. One half of a press stud can be mounted retrospectively in the aircraft cabin section via a (blind) rivet, for example. One side of a hook and loop fastener can easily be adhesively bonded thereon. For example, the first holding element can be attached to an inner side of a lining element on the door frame and/or on the passenger door.

For better understanding of the present disclosure, according to a further aspect, a door insulation means for a passenger door in an aircraft comprises at least one textile which is larger in at least one direction than the associated passenger door. By means of the use of a textile which is customarily flexible and pliant in a plurality of directions, the door insulation means can be easily adapted to the shape of the passenger door. In addition, a textile can be simply folded up, as a result of which the door insulation means can be stored compactly.

In one implementation variant, the door insulation means can comprise at least one holding element which is attached in or to the at least one textile and is designed to hold the door insulation means. The holding element can be integrated here in the door insulation means, for example can be integrated in the textile.

If, for example, a metal is involved, this can be integrated in the textile in the form of metal fibers. Alternatively or additionally, a metal piece can also be surrounded by the textile or attached to the textile, for example sewn into and/or sewn onto the textile. The same applies to other forms of holding elements, such as, for example, a magnet, one half of a press stud or one side of a hook and loop fastener.

The at least one holding element is arranged on/in the door insulation means in such a manner that it can hold the door insulation means. The at least one holding element is preferably attached to/in an edge region of the door insulation means. For example, a multiplicity of holding elements can be arranged along a circumference of the door insulation means in order to hold the entire door insulation means in stretched form. The position(s) of the at least one holding element corresponds (correspond) to (a) position(s) of a respective corresponding holding element, which corresponding holding element/elements is/are arranged, for example, on or around a passenger door in an aircraft cabin section. Each holding element can therefore be fastened to a corresponding holding element and can thus stretch the door insulation means over the passenger door and fix it in this position.

In one implementation variant, the at least one textile can be or can comprise a fleece or a woven fabric. The fleece can also be a woven fleece or can have a structure with arbitrarily arranged fibers. Furthermore, the fleece can be a constituent part of the door insulation means while another constituent part is a thin material which is arranged at least on one side of the fleece and is connected to the latter. Similarly, in a three-layered door insulation means, the fleece can be covered on both sides by a material and can therefore be enclosed between two lengths of material.

Furthermore, the at least one textile can be produced from polyester or a fiber containing polyester. Polyester affords the advantage of being lightweight, able to be folded easily and also of being heat resistant.

Of course, the at least one textile can also be produced from different materials. For example, a fleece can be produced from polyester or another polymer, while the fleece is covered at least on one side by a woven fabric or another material. The woven fabric or the material can be produced, for example, from cotton or another material. The visual impression of the door insulation means can thereby be easily adapted and improved.

In another implementation variant, the textile can have at least one section with a three-dimensional configuration. The section with a three-dimensional configuration is preferably of the same thickness. For example, the at least one section can be shaped in such a manner that it covers and/or surrounds a correspondingly shaped element of the passenger door. The at least one section can be produced, for example, by (hot) pressing and/or sewing.

In a further implementation variant, the at least one textile can comprise at least two subsections which, in each case, cover and insulate mutually adjoining sections of the passenger door. For example, the door insulation means can comprise an upper section which covers and insulates an upper part of the passenger door that customarily has few if any elevations or other elements. This upper section of the door insulation means can therefore be relatively flat.

Furthermore, the door insulation means can comprise a lower section which covers and insulates a lower part of the passenger door. Three-dimensionally protruding components, such as, for example, a holding arm or pivoting arm of the passenger door and/or an emergency chute with an associated covering, are arranged specifically in the lower region of passenger doors in aircraft. In the lower section, the door insulation means can take up a correspondingly shaped configuration in order to optimally fit against the passenger door and the elements thereof. In this lower section, the passenger door can have a three-dimensional configuration.

According to yet another aspect for better understanding of the present disclosure, an aircraft can be provided with at least one aircraft cabin section according to the first aspect. Alternatively or additionally, an aircraft can be provided with at least one door insulation means according to the further aspect.

Furthermore, the above-described aspects, implementation variants and examples can, of course, be combined without this being explicitly described. Each of the described implementation variants and each example should therefore be considered to be optional for each of the aspects and the implementation variants and examples thereof or already combinations thereof. The present disclosure is therefore not restricted to the individual refinements and implementation variants in the described sequence or in a certain combination of the aspects and implementation variants.

BRIEF DESCRIPTION OF THE DRAWINGS

Preferred exemplary embodiments of the invention will now be explained in more detail with reference to the attached schematic drawings, wherein:

FIG. 1 schematically shows a view of an aircraft cabin section;

FIG. 2 schematically shows a door insulation means;

DETAILED DESCRIPTION OF THE PREFERRED EMBODIMENTS

Figure 3:
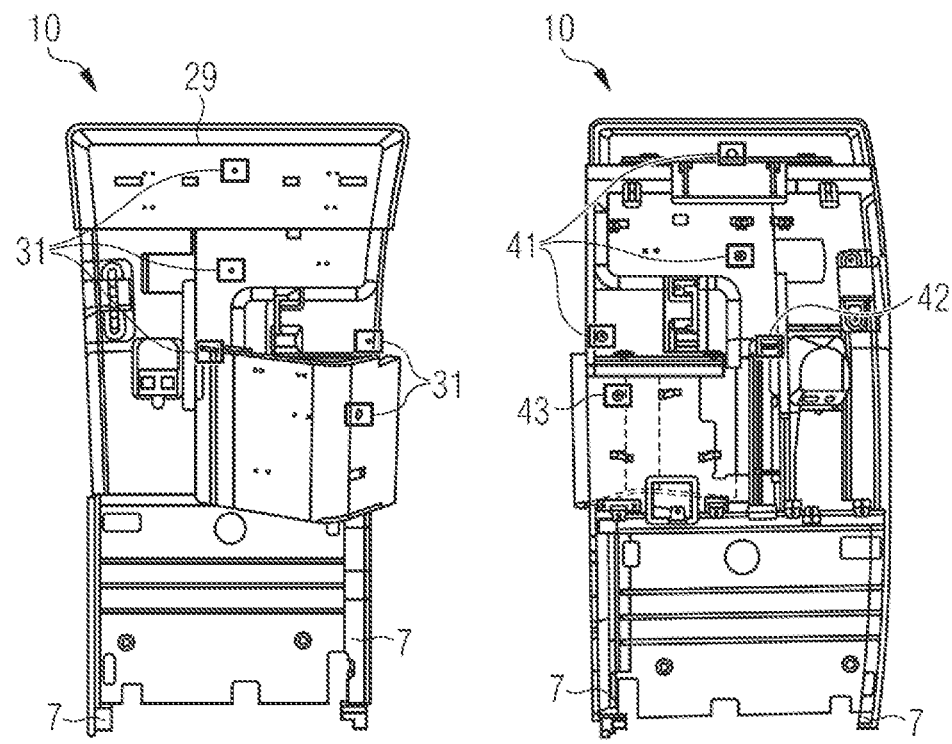
FIG. 3 schematically shows an inside view and outside view of a passenger door in a door frame.

FIG. 1 schematically shows an inside view of an aircraft cabin section 5 which comprises, in particular, a passenger door 10. The passenger door 10 is arranged in a door frame 7 (FIG. 4) and is designed to close a door opening 8 (FIG. 4) formed by the door frame 7 in an aircraft 1. Passengers can enter or leave the aircraft 1 through the passenger door 10. The door frame 7 is covered in FIG. 1 by lining elements 9 which, for example, form the interior of an aircraft cabin visually. A floor 6 of the aircraft cabin section 5 is arranged on the inside in front of the passenger door 10. This can be in particular the floor 6 of an aisle which extends from the passenger door 10 into the interior of the aircraft cabin.

In the variant illustrated, the passenger door 10 comprises an upper section, which is provided with an associated lining element 11, and a lower section. The lower section is distinguished by a relatively continuous surface. In other words, the lining element 11 has few to no elevations or recesses 17.

The lower section, by contrast, can comprise, for example, a holding arm or pivoting arm 13 to which the passenger door 10 is rotatably fastened and with which the passenger door 10 can be moved from a closed position (illustrated in FIG. 1) to an open position (not illustrated). The pivoting arm 13 can optionally also be provided with a corresponding lining element. Furthermore, the covering or lining 15 of an emergency chute is depicted in the lower section of the passenger door 10. While the upper section is relatively flat, in the lower region there are various elements, such as, for example, the pivoting arm 13 and the emergency chute 15 that protrude into the interior of the aircraft cabin.

In the closed position of the passenger door 10, although the latter closes the door opening 8, a certain gap 29 always remains between the passenger door 10 and the door frame 7. A loss of heat in the aircraft cabin section 5 may thereby occur. Thus, in particular in the region of the floor 6, an air flow 21 from the gap 29 into the interior of the aircraft cabin can result, with the air of the air flow 21 generally being colder than in the aircraft cabin. Furthermore, cold can "radiate" from certain elements or sections of the passenger door 10, i.e., cold elements of the passenger door 10, such as, for example, the pivoting arm 13 or else the lining element 11 in the upper section, withdraw heat from the surrounding area 22, 23, as a result of which the surrounding area 22, 23 has a chilling effect.

FIG. 2 shows a door insulation means 100 which can be intended, for example, for the passenger door 10 from FIG. 1. The door insulation means 100 comprises at least one textile, which is larger in at least one direction than the associated passenger door 10. For example, the door insulation means 100 on its upper side, on its left side, on its right side and/or on its lower side, can project over the passenger door 10. The door insulation means 100 can thus also cover a door gap 29 at least in sections on at least one side when the door insulation means 100 is attached to the passenger door 10 which is in its closed position.

The at least one textile can be or can comprise, for example, a fleece. Furthermore, the textile can alternatively be a woven fabric or can additionally comprise a woven fabric. Merely by way of example, the textile can be made from polyester or can comprise a fiber containing polyester.

Furthermore, the door insulation means 100 can be adapted to a passenger door 10. The door insulation means 100 can thus also comprise an upper section 107 and a lower section 109, the sections in each case corresponding in terms of size to the upper or lower section of the passenger door 10 (but is larger in at least one direction than the passenger door 10). The upper section 107 of the door insulation means 100 is distinguished by a flat profile. For example, the upper section 107 can be or can form a continuous surface or a continuous woven fabric. This upper section 107 is therefore also suitable for applying an application (not illustrated) to the door insulation means 100 or for integrating an application therein. For example, a figure, a logo (for example of the aircraft company), lettering, an image, etc. can be printed, inserted, sewn or fastened in some other way onto the door insulation means 100.

The lower section 109 of the textile can comprise at least one section 103, 105 which is shaped in such a manner that it surrounds a correspondingly shaped element 13, 15 of the passenger door 10. In other words, the textile is tailored or shaped in the lower region 109 in such a manner that it covers the three-dimensional element 13, 15 of the passenger door 10 and conceals same towards the inner side of the aircraft cabin. As a result, optimum insulation of the elements of the passenger door 10 is achieved.

For example, a section 103 can be shaped in a manner corresponding to the pivoting arm 13 and can cover the latter on an upper side, lower side and inner side. The same is true of the section 105 which replicates the emergency chute 15 or has a three-dimensional shape which corresponds to the latter, and which substantially covers all the (visible) inner surfaces of the emergency chute 15.

The at least one textile can be produced integrally, i.e., the upper section 107 and the lower section 109 are manufactured from one piece. Alternatively, the textile can be produced from a plurality of sections and sewn together or stuck together. Likewise alternatively, the textile can be composed of a plurality of sections which remain separate and can be attached separately to the passenger door 10. The latter can facilitate the attaching and also the stowing.

The door insulation means 100 furthermore comprises at least one holding element 110 which is attached in or to the at least one textile. It should be noted that, in FIG. 2, not all of the holding elements 110 have been provided with reference signs, in order to ensure that the illustration is legible. The holding element 110 serves, in particular, to hold the door insulation means 100. The at least one holding element 110 can be arranged, for example, along a circumference of the door insulation means 100. Furthermore, the at least one holding element 110 can also be arranged in a central region of the door insulation means 100. A holding element 110 in the circumferential region of the door insulation means 100 enables a secure attaching of the door insulation means 100 in the edge region of the passenger door 10 and over the gap 29. A holding element 110 in the central region of the door insulation means 100 prevents sagging of the door insulation means 100, i.e., a state in which the door insulation means 100 is spaced apart from the passenger door 10.

Furthermore, in particular in the region 109 in which there are three-dimensional shapes on the passenger door 10 and on the door insulation means 100, at least one holding element 110 can be arranged in an outer edge region of the three-dimensional shape. As a result, the door insulation means 100 is held as close as possible in the region of the door gap 29 and/or of the lining elements 9 in the region of the door frame 7 and/or in an associated plane along the passenger door 10, and the three-dimensional shape of the door insulation means 100 is optimally pulled over the corresponding three-dimensional shape of the passenger door 10.

FIG. 3 shows an aircraft cabin section 5 with a passenger door 10 in its closed position and associated door frame 7 in an inside view (on the left in FIG. 3) and in an outside view (on the right in FIG. 3). Lining elements 9, 11 of the aircraft cabin and passenger door 10 are not illustrated in either view.

The aircraft cabin section 5 comprises a first holding element 41-43, which is arranged on the passenger door 10. The first holding element 41-43 can be, for example, a magnet which is attached on an outer side of the passenger door 10 (see on the right in FIG. 3). The corresponding positions 31 on the inner side of the passenger door 10 are emphasized on the left in FIG. 3. These positions 31 correspond to the positions of the holding element 110, i.e., to a second holding element 110 which is arranged on and/or in the door insulation means 100. In a manner corresponding to the magnet, the second holding element 110 can be or can comprise a metal, as a result of which the door insulation means 100 can be fastened with its second holding elements 110 to the passenger door 10 by the magnetic forces of the first holding elements 41-43.

Of course, the first and second holding elements 41-43, 110 can also be other holding elements, such as, for example, in each case one half of a press stud or in each case a corresponding part of a hook and loop fastener. In this case, the first holding element 41-43 would be arranged on the inner side of the passenger door 10 in order to be reachable from the inner side (i.e., at the positions 31 illustrated on the left in FIG. 3).

Figure 4:
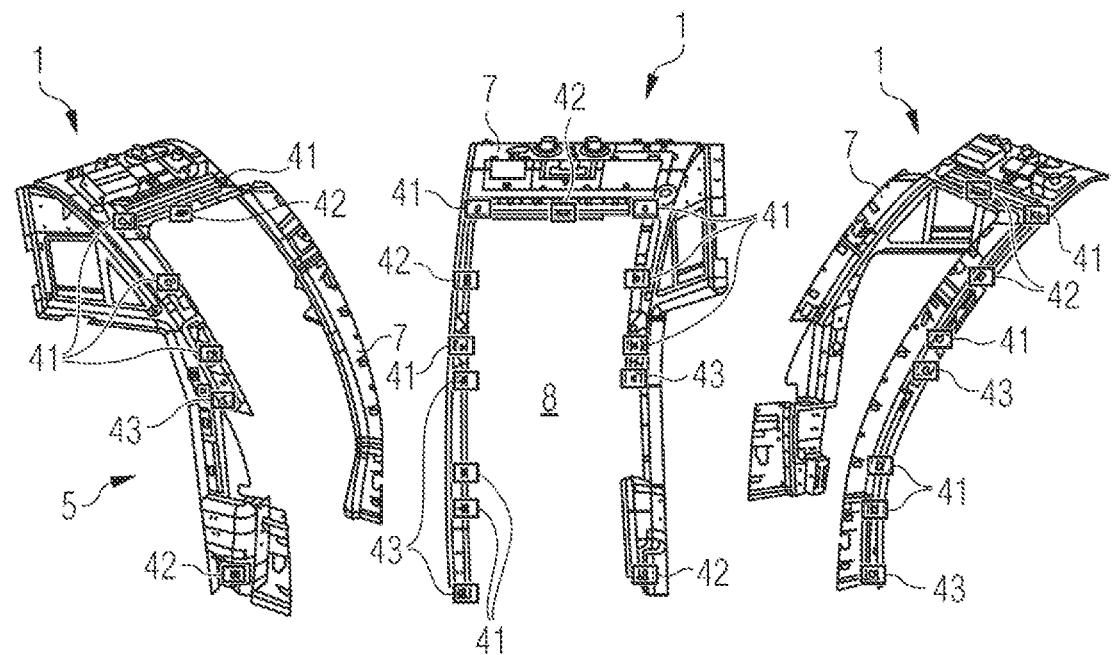
FIG. 4 schematically shows two outside views and an inside view of a door frame.

FIG. 4 furthermore shows the door frame 7 with the door opening 8 of the aircraft cabin section 5, wherein the passenger door 10 has been removed. First holding elements 41-43 can also be arranged on the door frame 7. While, in the central illustration of FIG. 4, the holding elements 41-43 are provided on the inner side of the door frame 7, they can alternatively or additionally also be arranged on an outer side (see left and right illustration of FIG. 4) of the door frame 7. Holding elements 41-43 attached on the outer side can be implemented, in particular, by a magnet, the magnetic forces of which act on the inner side of the door frame 7 where they can act on a magnetically effective material. Of course, the first holding elements 41-43 can also be magnetically effective materials while the second holding elements 110 in the door insulation means 100 are magnets. In both cases, a door insulation means 100 can be fastened with corresponding second holding elements 110 on the inner side in the aircraft cabin section 5 to the door frame 7. The holding elements 41-43, 110 can also be implemented here by press studs, hook and loops fasteners and similar fasteners.

Figure 5:
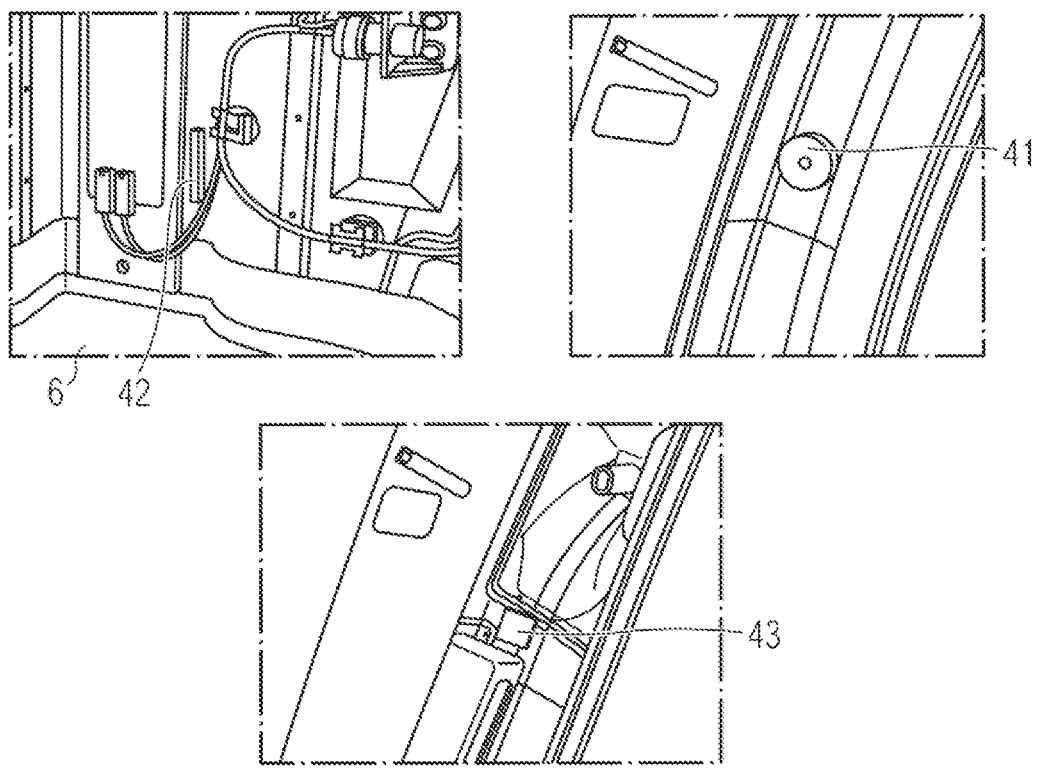
FIG. 5 schematically shows detailed views of holding elements.

FIG. 5 illustrates corresponding first holding elements 41-43 by way of example. In particular in the case of magnets or magnetically effective holding elements 41-43, they can be adapted in their shape to the surrounding area (here an outer side of the door frame 7). The first holding element 42 can thus have, for example, a rectangular elongated shape. Another first holding element 41 can be circular or elliptical. A further holding element 43 can be of square shape or, as illustrated in FIG. 5, can be a magnetically effective material in the form of a thin metal plate. The corresponding second holding elements 110 in/on the door insulation means 100 can be correspondingly shaped in order to bring about as good fixing as possible.

Figure 6:
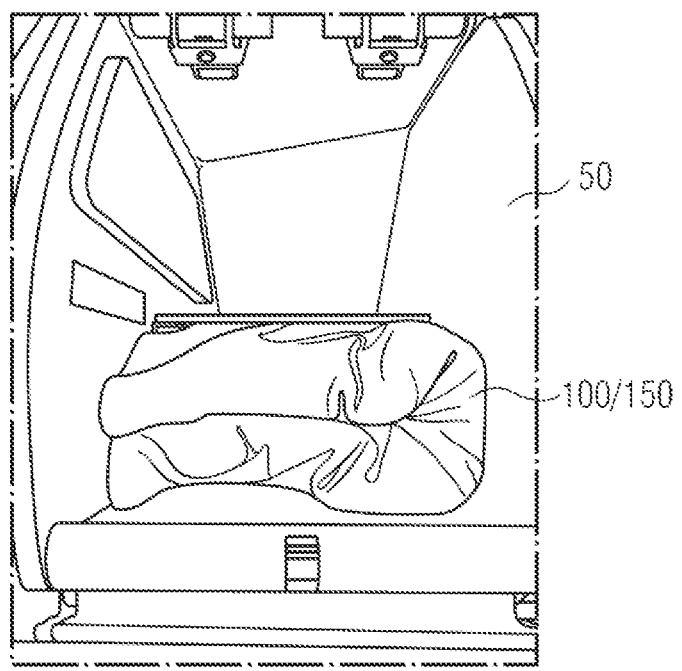
FIG. 6 schematically shows a folded-up and stowed door insulation means.

FIG. 6 finally shows a door insulation means 100 in the folded-up state. Since the door insulation means 100 is produced from a textile material, it can have a small thickness, for example between 2 and 10 mm, preferably between 3 and 7 mm.

As a result, the door insulation means 100 can be folded very small and stowed in a simple manner. In FIG. 6, the door insulation means 100 is additionally packed in a bag 150 which can simply be placed into a luggage compartment 50 in the aircraft 1 without completely blocking the luggage compartment. Other storage spaces/storage compartments in the cabin of the aircraft 1 are likewise possible.

The above-described exemplary embodiments and variants serve only for illustrating the invention. All of the examples, variants and individual details can be combined with one another as desired in order to form certain embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin section, comprising:
a door frame, which forms a door opening in a skin of an aircraft, the door opening allowing a user to enter and exit the aircraft;
a passenger door, which is arranged on the door frame and is configured to close the door opening;
a floor located within the aircraft cabin section in front of the passenger door; and
a door insulation means, which lies at least in sections against the passenger door and is larger in at least one direction than the door opening, wherein the door insulation means is produced from a textile material which is at least one of heat-insulating or airflow-inhibiting,
wherein the door insulation means is dimensioned in such a way that it is larger than the door opening in a lower section and rests on the floor of the aircraft cabin section, the aircraft cabin section further comprising:
a first holding element, which is arranged on at least one of the door frame or on the passenger door; and
a second holding element, which is arranged at least one of on or in the door insulation means and is configured to enter into operative connection with the first holding element and to hold the door insulation means,
wherein the first holding element comprises a magnetic material or a magnetically effective material and, correspondingly thereto, the second holding element comprises a magnetically effective material or a magnetic material.

2. The aircraft cabin section according to claim 1, wherein the magnetic material or the magnetically effective material of the first holding element is arranged on an outer side of a lining element of the door frame or of the passenger door.

3. The cabin section of claim 1,
wherein the textile material is or comprises a fleece, and
wherein the textile material is produced from polyester or a fiber containing polyester.

4. The cabin section of claim 1,
wherein the textile material has at least one section with a three-dimensional configuration, and
wherein the at least one section is shaped in such a manner that the at least one section surrounds a correspondingly shaped element of the passenger door.

5. The cabin section of claim 1, wherein the textile material is composed of at least two subsections which each cover and insulate mutually adjoining sections of the passenger door.

6. An aircraft having at least one aircraft cabin section according to claim 1.

* * * * *